United States Patent [19]

Wallis

[11] Patent Number: 5,069,053

[45] Date of Patent: Dec. 3, 1991

[54] METHOD AND APPARATUS FOR CUTTING CORRUGATED WEBS

[76] Inventor: Bernard J. Wallis, 2215 Dacosta, Dearborn, Mich. 48128

[21] Appl. No.: 361,423

[22] Filed: Jun. 5, 1989

[51] Int. Cl.$^5$ .................... B21D 13/04

[52] U.S. Cl. .................... 72/185; 72/187

[58] Field of Search .................... 72/185, 187; 83/18, 83/235, 236, 282

[56] References Cited

U.S. PATENT DOCUMENTS

| | | | |
|---|---|---|---|
| 2,071,584 | 2/1937 | Shippy | 72/185 |
| 2,975,817 | 3/1961 | Neff | 72/185 |
| 4,523,500 | 6/1985 | Maruyama et al. | 72/185 |

*Primary Examiner*—Lowell A. Larson

*Attorney, Agent, or Firm*—Barnes, Kisselle, Raisch, Choate, Whittemore & Hulbert

[57] ABSTRACT

A method and apparatus for cutting corrugated webs from a strip which is continuously formed to define undulating fins or corrugations extending transversely of the strip. The method and apparatus comprise periodically interrupting the movement of the corrugated strip, spreading a corrugation in the direction of the longitudinal axis of the strip and severing the corrugation at the spread corrugation and the apex of the corrugation. More specifically the corrugated strip is interrupted, the adjacent corrugations are moved longitudinally relative one another to locate the corrugation to be cut and a cutter is moved between the adjacent apices to cut the connecting oppositely disposed apex. In one form adjacent apices are engaged and spread apart. In another form, a finger engages a side of a corrugation to position the corrugation to be cut.

11 Claims, 8 Drawing Sheets

21 22 23 24 25 28 26 27

11
43
55
56
46
49
W
44
40
42
47
45
37
41
39
38
33
11
35
36
34

10
10
43
55
56
63
61
2
2
49
29
48
30
44
46
43
47
42
45
41
40
39
34

W
28
26
72
71
70a
77
70
78b 15
71

14
72
X
73
W
70a
77
70
78b
78a
15
75
79
14

X
W
70

70a
77
78b
78a
75
79

W
71
73
72
78b
70
74
74
75
79

METHOD AND APPARATUS FOR CUTTING CORRUGATED WEBS

This invention relates to making continuous corrugated strips and particularly to the cutting of predetermined lengths from such corrugated strips.

BACKGROUND AND SUMMARY OF THE INVENTION

It is well know to form corrugated strips for use in various devices such as the fins of heat exchangers by moving a flat strip continuously between forming rolls and thereafter through packing rolls to a cutting position, interrupting the movement momentarily at the cutting station and cutting a predetermined length of web from the strip. If the length of corrugated strip is not precisely controlled, the cutting may occur along portions other then the apices which connect the strip. The resultant edge is flawed, makes it difficult to handle the strip. In addition, such an edge can adversely affect the positioning of the strip in the device in which it is to be used.

The problem of cutting such strips is made more complex because of the differences in characteristics of materials. For example, some materials inherently remain in the formed position while others are readily deformed. This affects the spacing of the number of corrugations in any unit length. Specifically corrugations of aluminum tend to return to there original configuration and spacing if spread in longitudinal direction of the web. Copper, on the other hand, must be handled carefully since it does not tend to return to original configuration and spacing. The problem is further complicated by the fact that the spacing of the corrugations may be such that it is difficult to move a cutter into position for cutting at the apex the corrugation Accordingly among the objectives of the present invention to provide a method and apparatus for ensuring that the strip will be cut along an apex; which method and apparatus is simple reliable and can be precisely accurately controlled.

In accordance with the invention, a method and apparatus for cutting corrugated webs from a strip which is continuously formed to define transverse undulating fins or corrugations comprises periodically interrupting the movement of the corrugated strip, spreading a corrugation in the direction of the longitudinal axis of the strip and severing the corrugation at the spread corrugation and the apex of the corrugation. More specifically the corrugated strip is interrupted, adjacent corrugations are moved longitudinal relative one another to locate the corrugation to be cut and a cutter is moved between the adjacent apices to cut the connecting oppositely disposed apex. In one form adjacent apices are engaged and spread apart. In another form, a finger engages a side of a corrugation to position the corrugation to be cut.

DESCRIPTION

Figure 1:
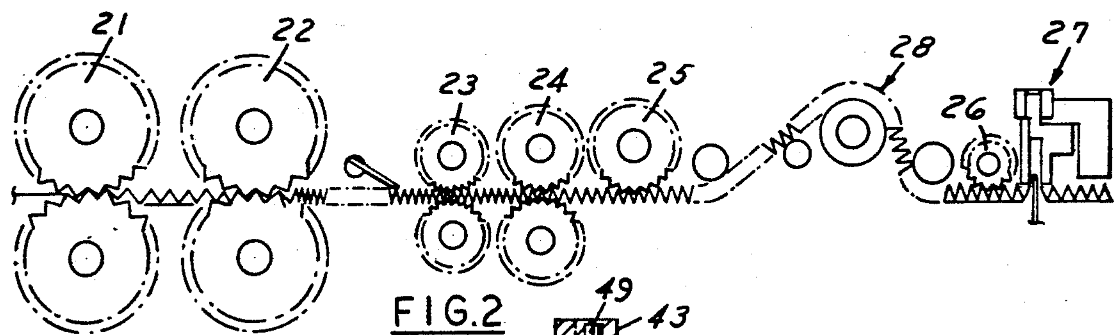
FIG. 1 is a diagrammatic view of a apparatus for forming a corrugated strip.

Referring to FIG. 1, the invention relates to a corrugating apparatus of generally conventional construction wherein a strip S, for example, such as a metal strip of aluminum or copper, is delivered from a reel to a sets of forming rolls 21, 22 that form corrugations through to pairs of packing rolls 23, 24, 25 which determine the number of corrugations per unit length and then to a roll 26 that momentarily interrupts the movement of the corrugated strip so that a cutting apparatus 27 may function to cut a predetermined length L from the corrugated strip. The space between the roll 25 and roll 26 is such that when the roll 26 is interrupted while the rolls 23-25 continue to rotate, the corrugated strip will accumulate in the area 28.

Figure 5:
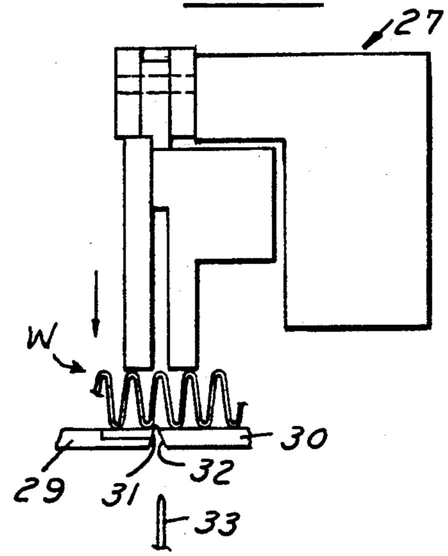
Figure 6:
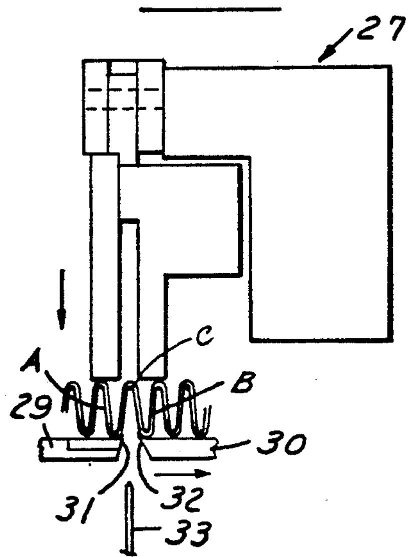
Figure 7:
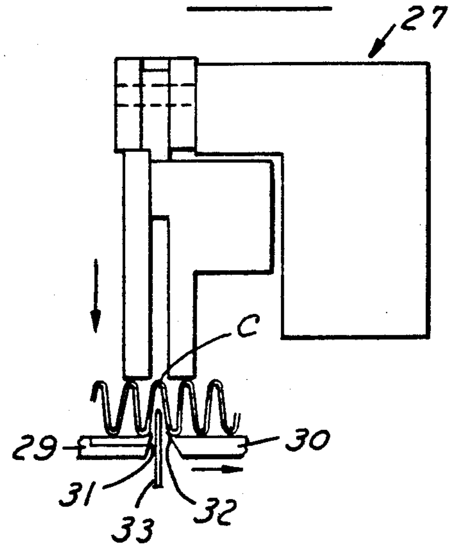
Figure 8:
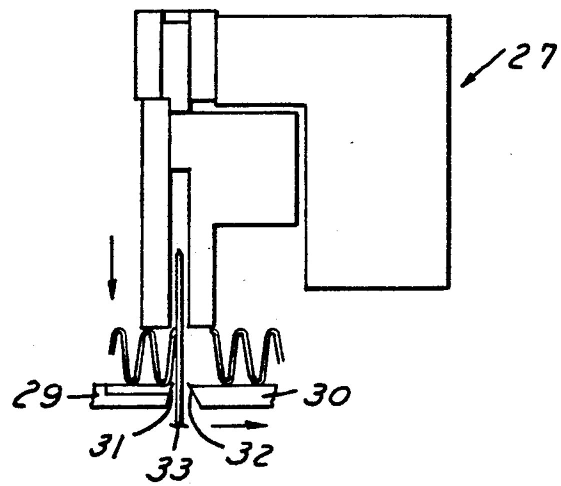

Referring to FIGS. 4-8, in accordance with the invention, the cutting apparatus 27 functions to move the adjacent corrugations longitudinally relative to one another to locate the corrugation to be cut by a cutter. In the form shown in FIGS. 4-8, the cutting apparatus grips the corrugated strip W by a downward movement against a pair of inserts 29, 30 each of which has an upwardly tapered edge 31, 32 (FIG. 5). The insert 30 is thereafter moved horizontally away from insert 29 in the direction of the arrow, as shown in FIG. 6, to separate the adjacent apices A and B, opening the opposite corrugation C to expose the opposite apex C so that a rotary cutter 33 can be readily moved upwardly into the corrugation C to be cut (FIG. 7) and accurately sever the center of the apex C (FIG. 8).

The apparatus for performing the method is shown in FIGS. 2, 3 and 9-11 wherein the cutter 33 is shown as comprising a circular saw rotatably mounted and driven on a lever 34 that is pivoted about an axis 35 and caused to oscillate by engagement of a cam follower 36 there on with a endless cam track 37 on a circular cam 36 which is rotated by a drive (not shown). In this manner the cutter 33 is moved from the solid line position shown in FIG. 9 to the broken line position shown in FIG. 9 to sever a length L from the corrugated strip W.

Figure 9:
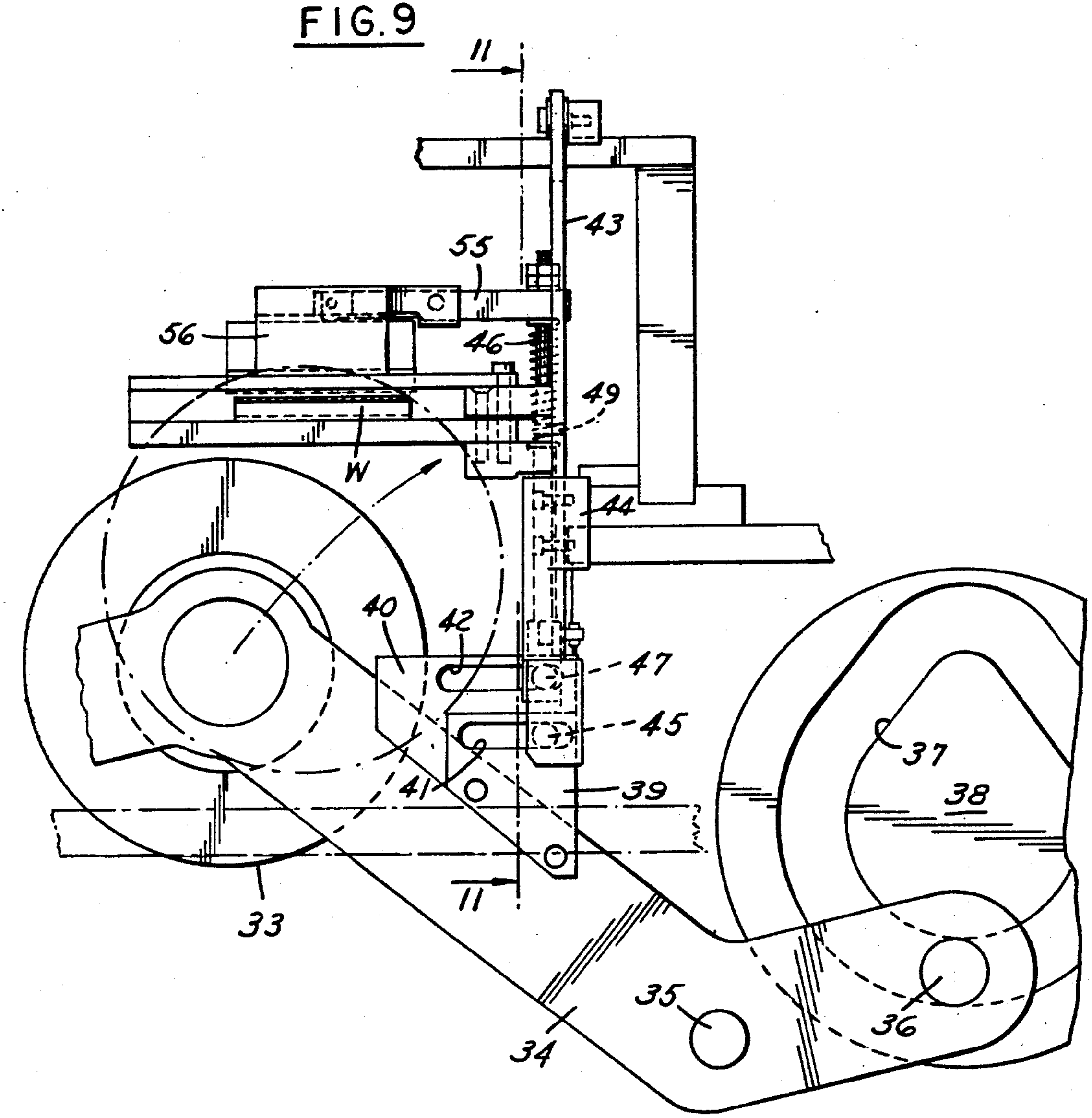
FIG. 9 is a fragmentary side elevational view of the cutting apparatus.

As the lever 34 moves in the direction of the arrow as shown in FIG. 9, it causes cam plates 39, 40 fixed there on to move vertically. The cam plates 39, 40 include transverse slots 41, 42. A first slide member 43 is guided for vertical movement in a fixed member 44 and has a pin 45 engaging the slot 42 such that when the lever 34 is oscillated, the first slide member 43 is moved vertically upwardly and downwardly. Similarly, a second slide 46 extends through the fixed slide 44 and has a transverse pin 47 engaging the slot 42 so that it is also moved vertically upwardly and downwardly as the lever 34 is oscillated. The movement of the slide member 43 is utilized to move the insert 30 relative to the insert 29, as presently described, and the movement of the slide member 46 is utilized to grip the upper surfaces of the corrugations, as presently described.

Figure 10:
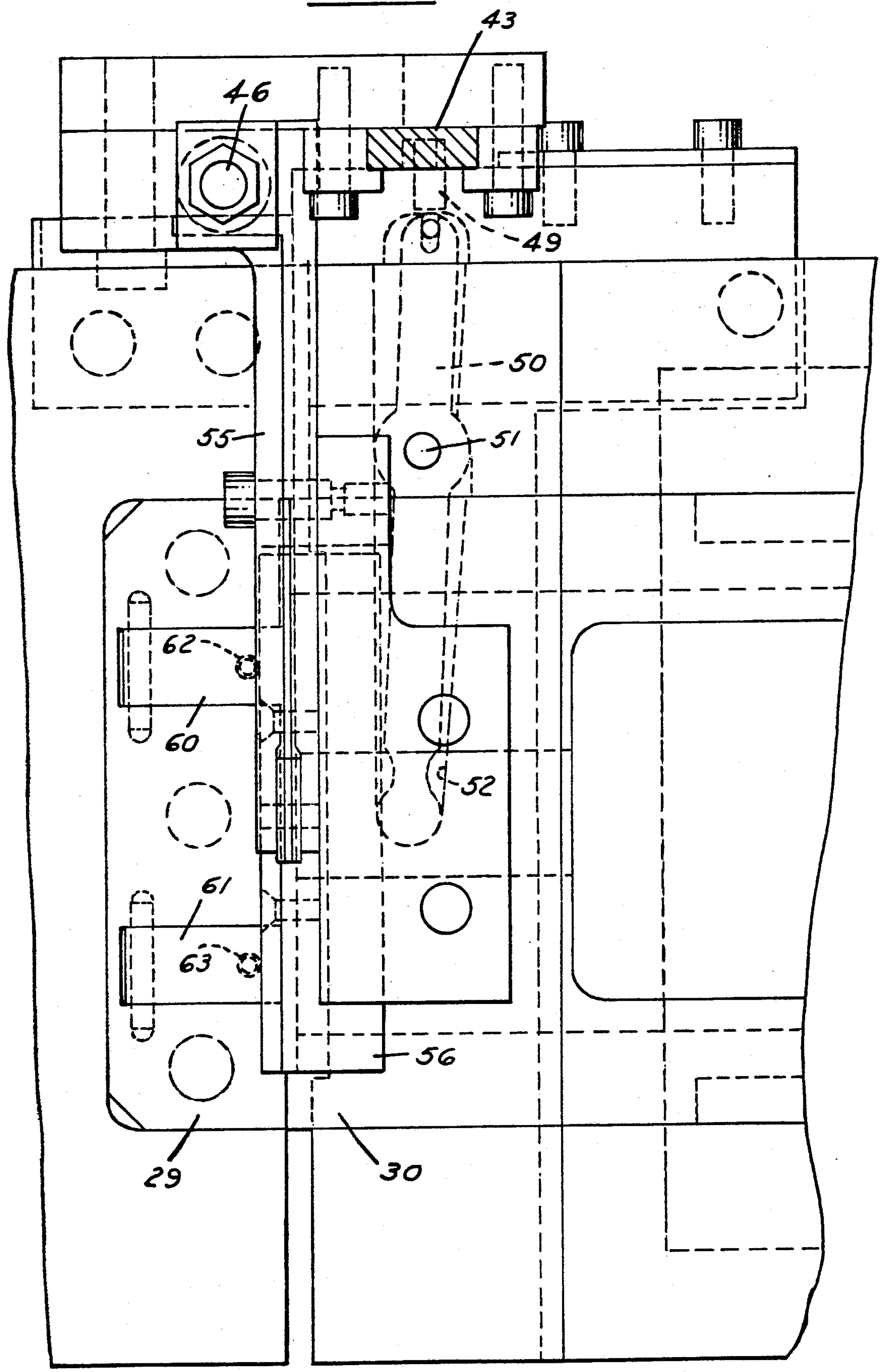
FIG. 10 is a fragmentary plan view of the cutting apparatus.
Figure 11:
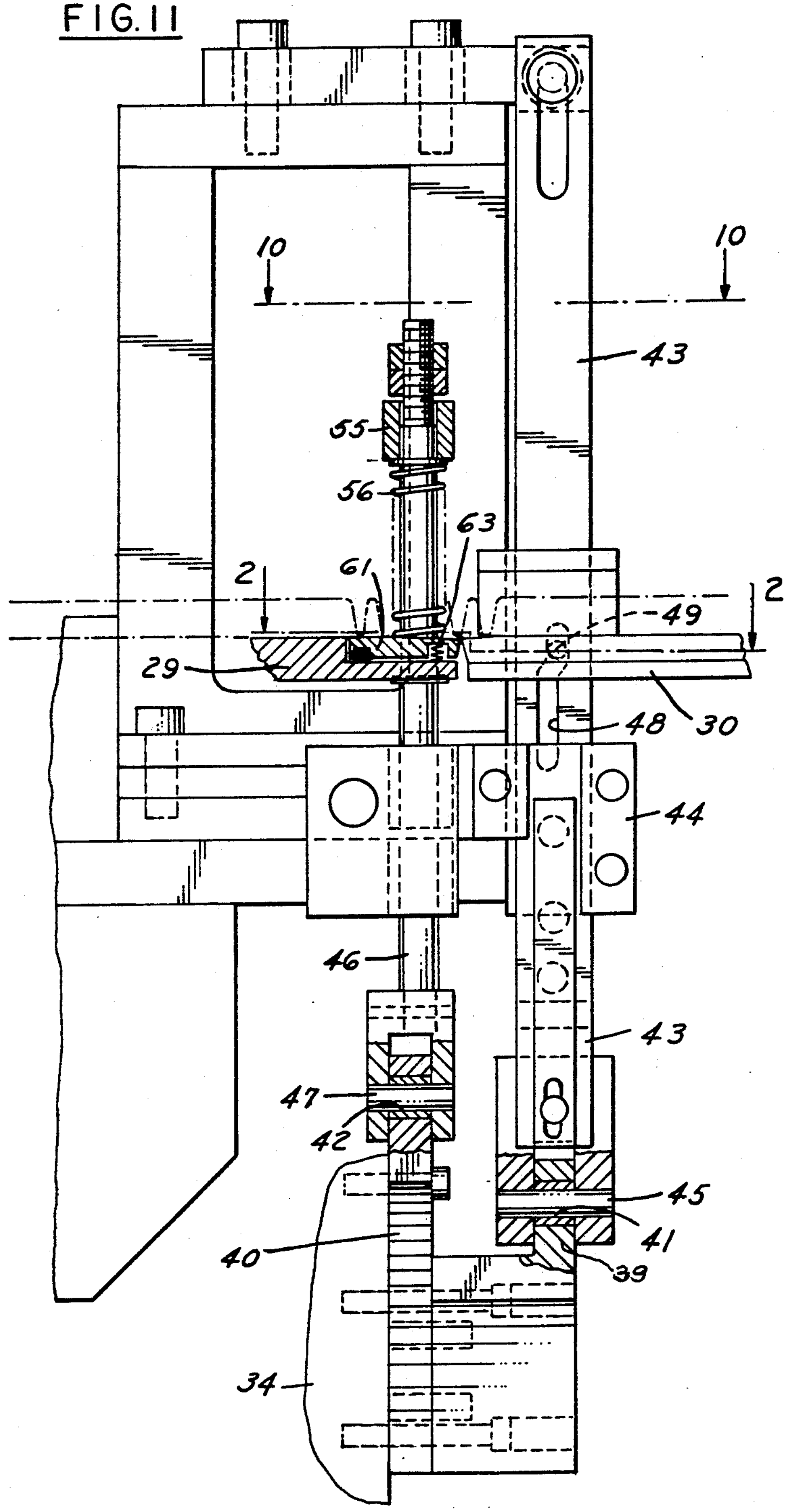
FIG. 11 is a part sectional view taken long the line 11—11 in FIG. 9.
Figure 12:
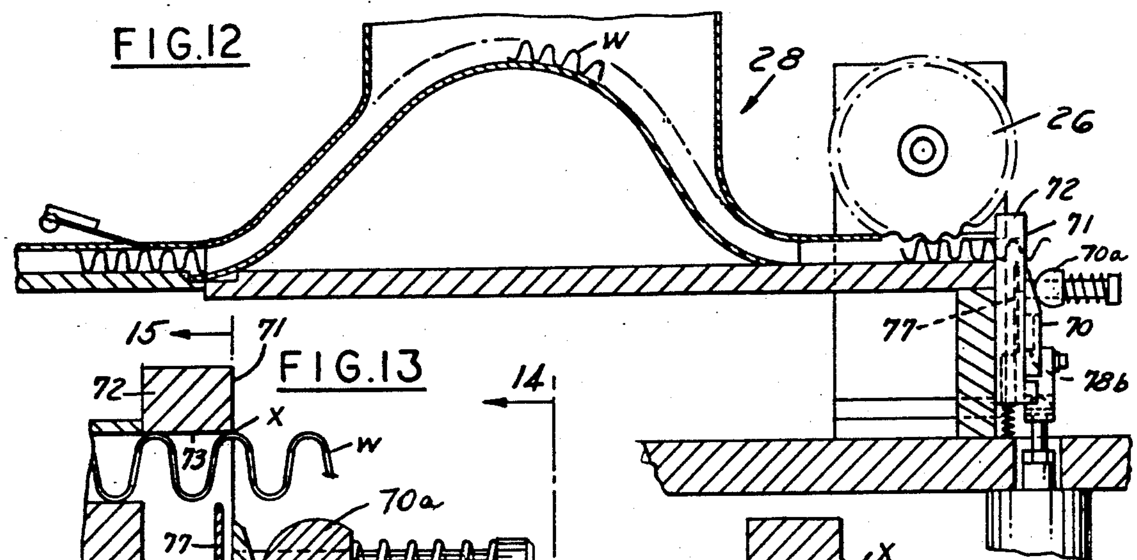
FIG. 12 is a fragmentary view of a modified form of apparatus.

Referring to FIGS. 9-11, first slide member 43 has a generally vertical slot 48 there in that defines a cam which is engaged by a pin 49 so that when the slide is moved upwardly insert 30 is moved horizontally or to the right, as viewed in FIG. 11, away from the insert 29. When the slide member 43 is moved downwardly the insert 30 is moved horizontally toward the insert 29. Inasmuch as the slide member 43 is mounted on one side of the path of travel of the corrugated web W the movement from the slide member 43 to the insert 30 is achieved by mounting the pin 49 (FIGS. 2, 3, 10) so that it engages one end of a lever 50 pivoted about a vertical shaft 51 and engaging a pocket 52 in the insert 30 so that the vertical movement of the slide member 43 is translated to a horizontal movement of the insert 30 underlying the corrugated web W.

The movement of the shaft 46 is utilized to grip the upper surface of the corrugated web W. As shown in FIGS. 9, 10, and 11, the slide member 46 is mounted vertically at one side of the corrugated web and has an overlying arm 55 fixed to the upper end thereof and yielding urged upwardly by a spring 56. The arm 55 supports a gripping member 56 that is moved upwardly and downwardly into an out of engagement with the corrugated web W.

Figure 2:
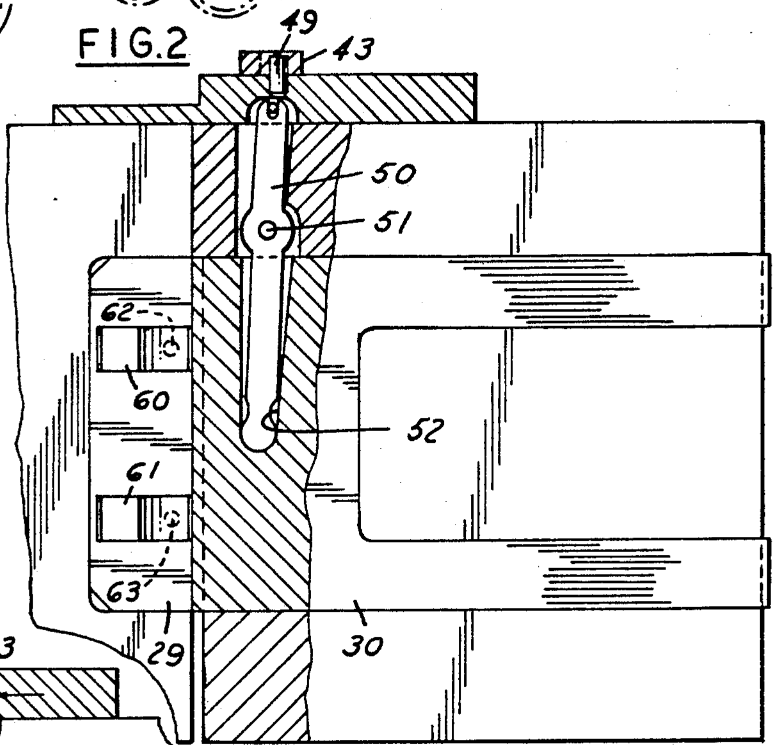
FIG. 2 is a fragmentary plan view of a portion of the cutting apparatus.
Figure 3:
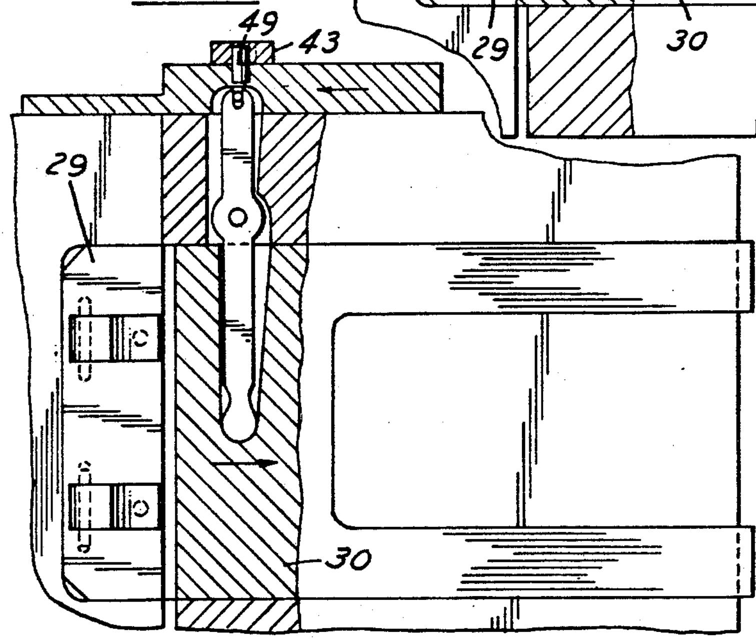
FIG. 3 is a view similar to FIG. 2 showing the parts in a different operative position.
Figure 4:
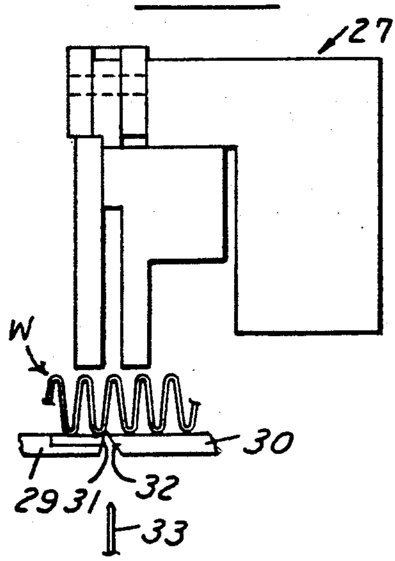
FIGS. 4-8 are diagrammatic views showing the method and apparatus for cutting the corrugated strip.

In order to facilitate movement of the strip across the inserts 29, 30, which have the hooks or edges 31, 32 of the inserts 29, 30 are provided with pads 60, 61 that are yieldingly urged upwardly by coil springs 62, 63 to guide the strip over the edges 29, 30 until the holddown member 56 is brought into position (FIGS. 2, 11).

Figure 13:
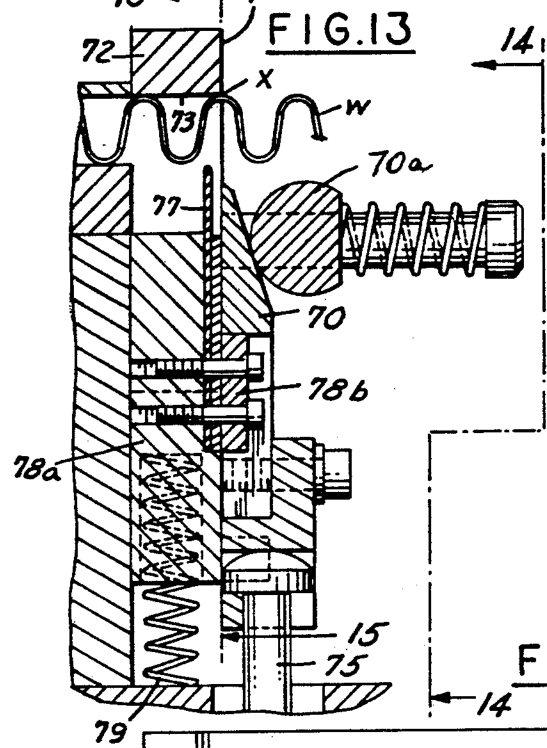
FIG. 13 is a fragmentary sectional view of the portion of the apparatus shown in FIG. 12.
Figure 13A:
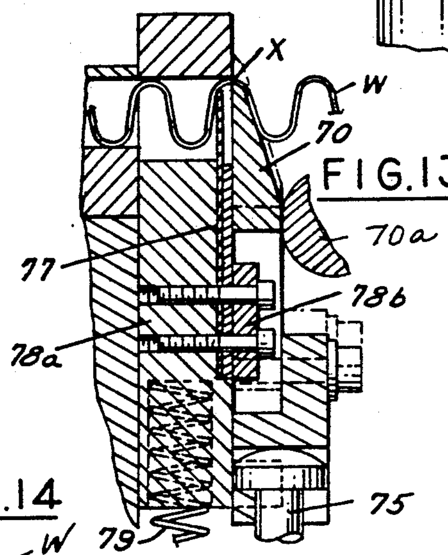
FIG. 13*a* is a fragmentary sectional view similar to FIG. 13 showing the parts in a different operative position.
Figure 14:
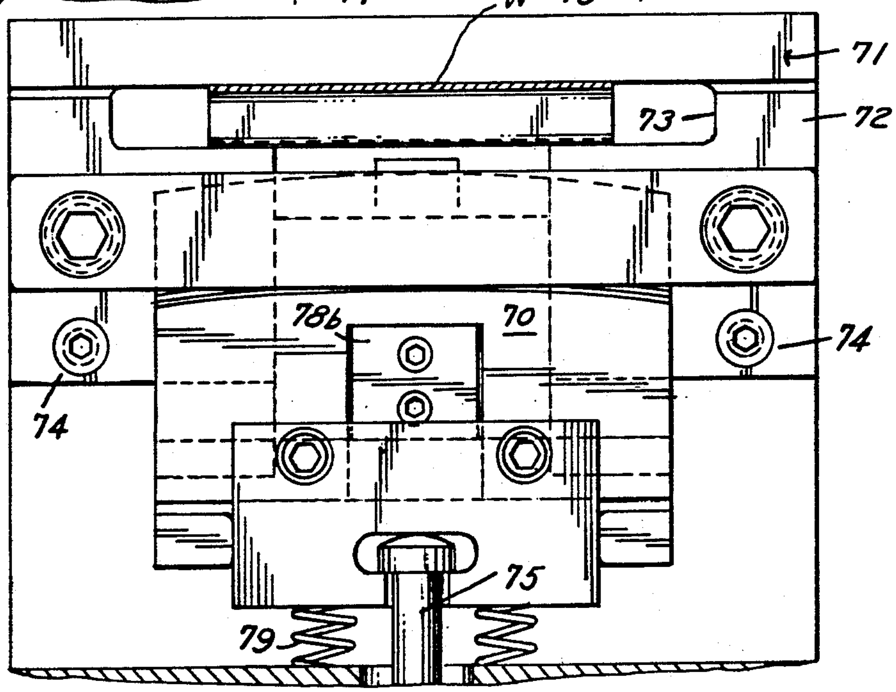
FIG. 14 is a sectional view taken along the line 14—14 in FIG. 13.
Figure 15:
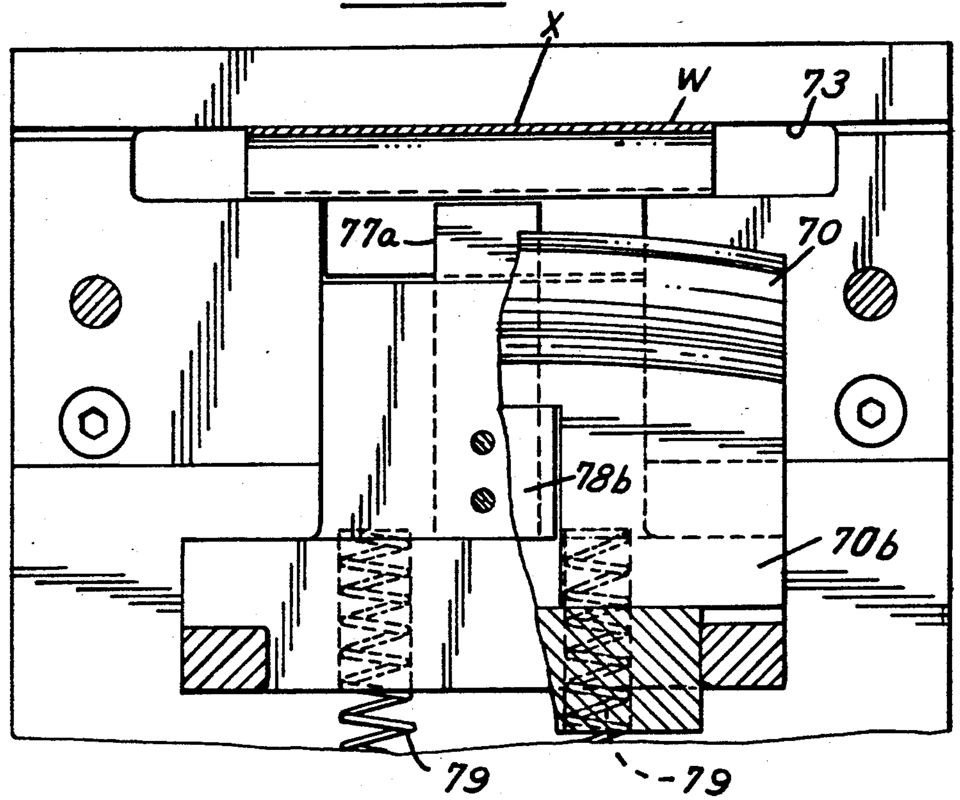
FIG. 15 is a sectional view taken along the line 15—15 in FIG. 13.

In the modified form of apparatus shown in FIGS. 12-15, the web is cut by movement of a shear blade against a fixed surface rather than by a rotary cutter. This form is particularly adapted for use with webs made of a material that readily retains the form such as aluminum. In this form, shear blade 70 is mounted for vertical movement against a surface 71 of a shear block 72 that has a passage 73 through which the web passes. As shown in FIG. 14 the blade 70 is mounted in guide blocks 74 and is moved by a connecting pin 75 through a motor cylinder or the like. A spring loaded member **70*a* applies pressure to hold the blade 70 against surface 71. In accordance with the invention, a locating member 77 is clamped between blocks 78*a* and 78*b*. A spring 79 yielding urges locating member 77 upwardly. During the initial movement of the blade 70 upwardly the locating member 77 engages the side of a corrugation as shown in FIG. 13A, to locate the corrugation. Upon contact with the corrugation, the locating member 77 is stopped by abutment of block 78*b* with shear blade 70 thereby stopping its upward movement. Continued upward movement of the shear blade 70 relative to the locating member 77** shears the located apex X at the desired location.

Figure 16:
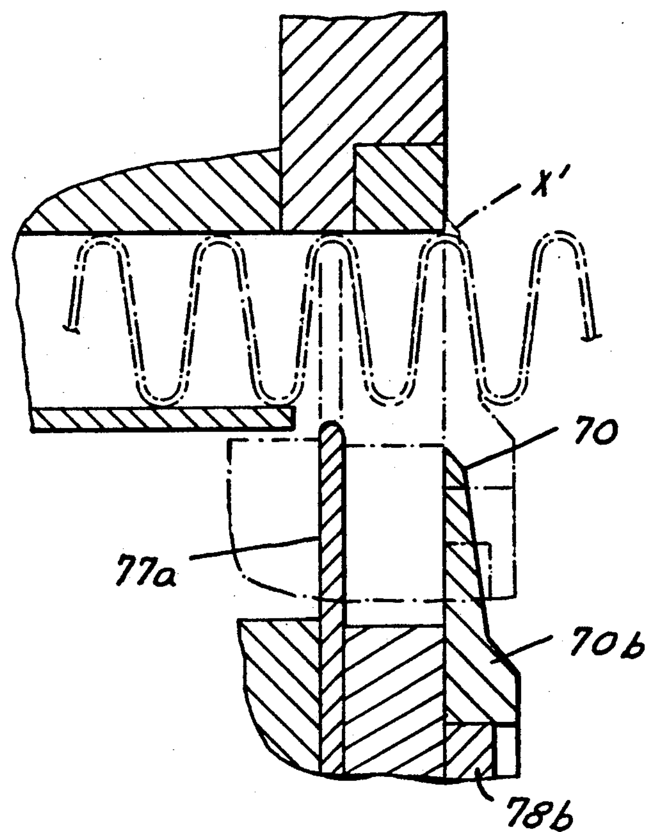
FIG. 16 is a fragmentary sectional view of a further modified form of apparatus.

In the modified form shown in FIG. 16, the locating blade **77*a* is spaced longitudinally rearwardly or upstream from the shear blade 70*b*** so that it locates against the side wall of an adjacent corrugation spaced from the corrugation X' which is to be cut.

Figure 18:
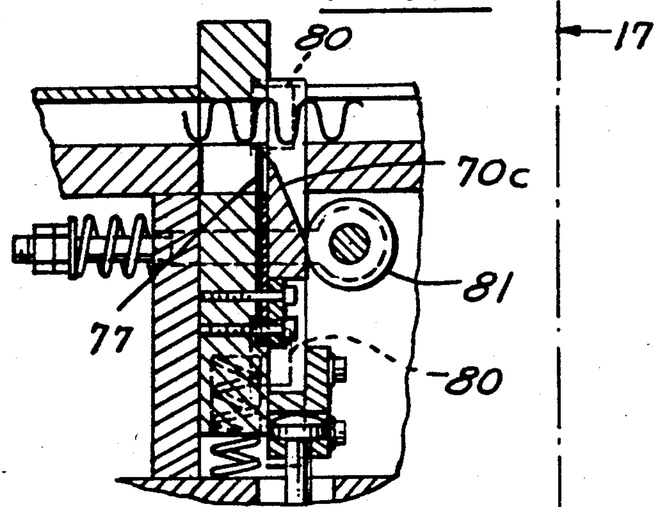
FIG. 18 is a fragmentary sectional view taken along the line 18—18 in FIG. 17.
Figure 17:
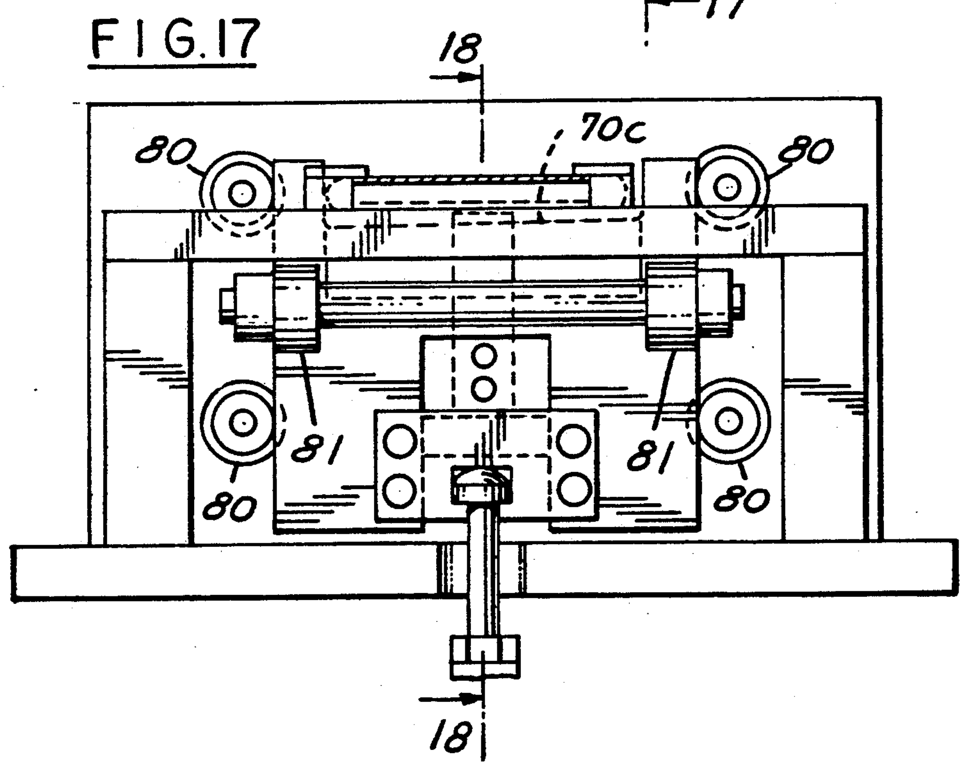
FIG. 17 is an end view of a further modified form of apparatus.

In the modified form shown in FIG. 18, the construction is similar to that shown in FIGS. 12-15 except that the cutter blade **70*c* is guided in its vertical movement by transverse rolls 80 along the side edges of the cutter blade 70*c* and spring loaded pressure rolls 81 engaging the outer surface of the blade 70*c* in place of the spring loaded pressure member 70*a* shown in FIG. 13**.

It can thus be seen that there has been provided a method invention to provide a method and apparatus for ensuring that the strip will be cut along an apex; which method and apparatus is simple reliable and can be precisely accurately controlled.

I claim:

1. In the method of continuously forming a corrugated web from a flat strip wherein the web is continuously moved between forming rollers and thereafter to a cutting position wherein predetermined length of corrugated web is severed from corrugated web, the improvement comprising interrupting the movement momentarily of the corrugated web at a cutting station while continuing to form the flat strip so that the upstream formed portion of the web is accumulated during the interruption in the movement, moving the corrugations relative to one another to locate an apex of a corrugation to be cut and cutting the corrugation of the located apex, said step of locating the corrugation comprising engaging the apices of the corrugations on one side of the web opposite to the apex to be cut and spreading these corrugations such that the cutting can be achieved through the opposed apex.

2. The method set forth in claim 1 wherein said step of cutting is achieved by a circular saw.

3. The method set forth in claim 2 wherein said method includes engaging the apices of the corrugations opposite to those which are engaged and spread apart.

4. The method set forth in claim 3 wherein said step of engaging the opposite apices is performed before the apices are spread.

5. The method set forth in claim 4 wherein said web is moving horizontally and said step of engaging the opposite apices comprises engaging the upper surface of the web and the step of the engaging the apices to be spread is on the lower surface of the web.

6. In apparatus for continuously forming a corrugated web from a flat strip wherein the web is continuously moved between forming rollers and thereafter to a cutting position wherein predetermined length of corrugated web is severed from corrugated web, the improvement comprising means for momentarily interrupting the movement of the corrugated web at a cutting station while continuing to form the flat strip so that the up stream formed portion of the web is accumulated during the interruption in the movement, means for moving the corrugations relative to one another to locate the apex of a corrugation to be cut and means for cutting the corrugation of the located apex, said means for location the corrugation comprising means engaging the apices of the corrugations on one side of the web opposite to the apex to be cut and, means for spreading these corrugations such that the cutting can be achieved through the opposed apex.

7. The apparatus set forth in claim 6 wherein said means for cutting comprises a circular saw.

8. The apparatus set forth in claim 7 wherein including means for engaging the apices of the corrugations opposite to those which are engaged and spread apart.

9. The apparatus set forth in claim 8 wherein said means for engaging the opposite apices is operable prior to said means for spreading said apices.

10. The apparatus set forth in claim 9 including means for guiding said web horizontally, said means for engaging the opposite apices is provided adjacent the upper surface of the web and said means for engaging the apices to be spread is provided adjacent on the lower surface of the web.

11. The apparatus as set forth in claim 10 wherein said circular saw comprises means for moving said saw into and out of position for cutting a corrugation and means operatively connecting said means for moving said saw, said means for engaging said opposite apices and said means for engaging said apices to be spread to sequentially engages said means for engaging said opposed apices, said means for spreading said apex and thereafter said means for moving said saw to cut said apex.

* * * * *